Figure 8:
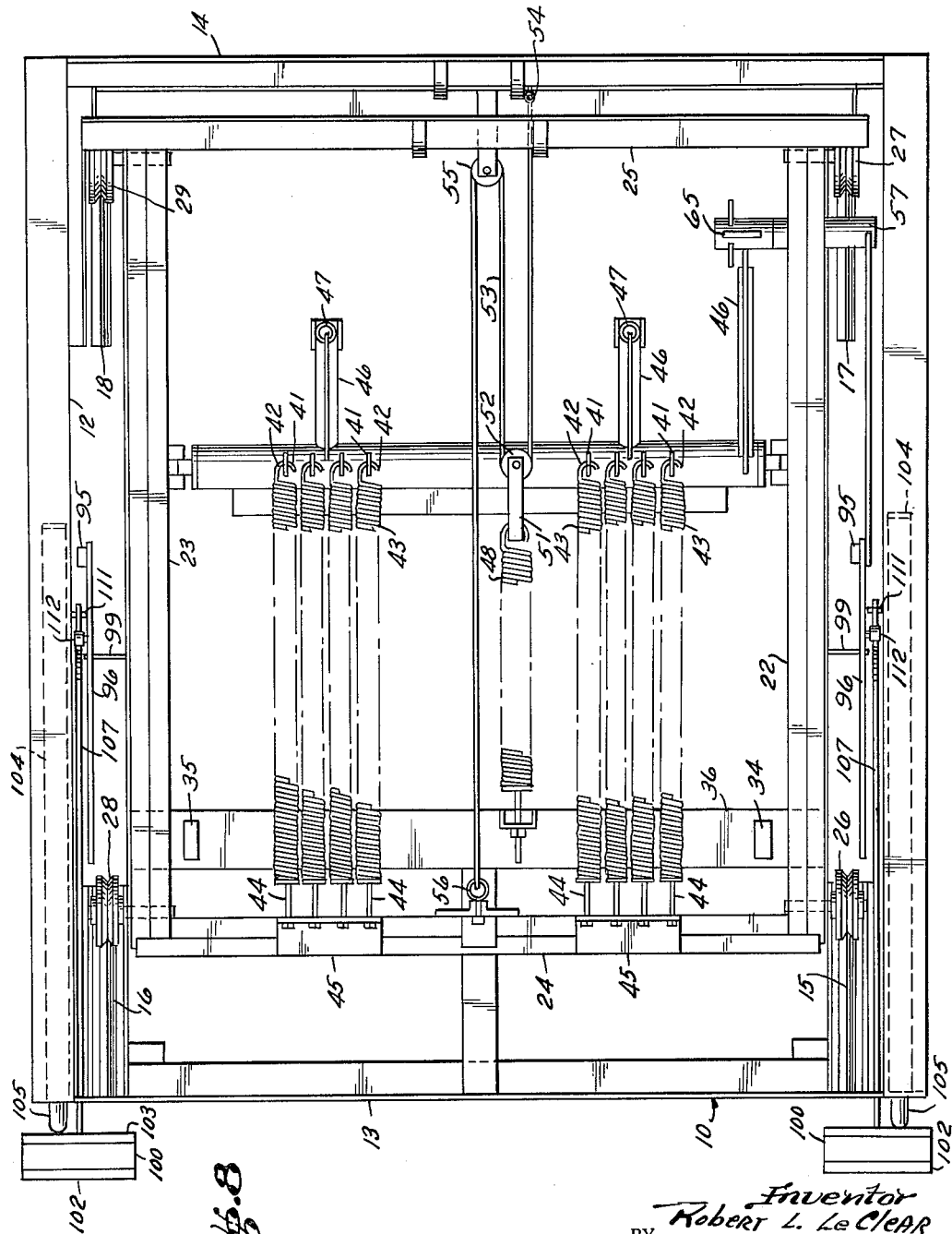

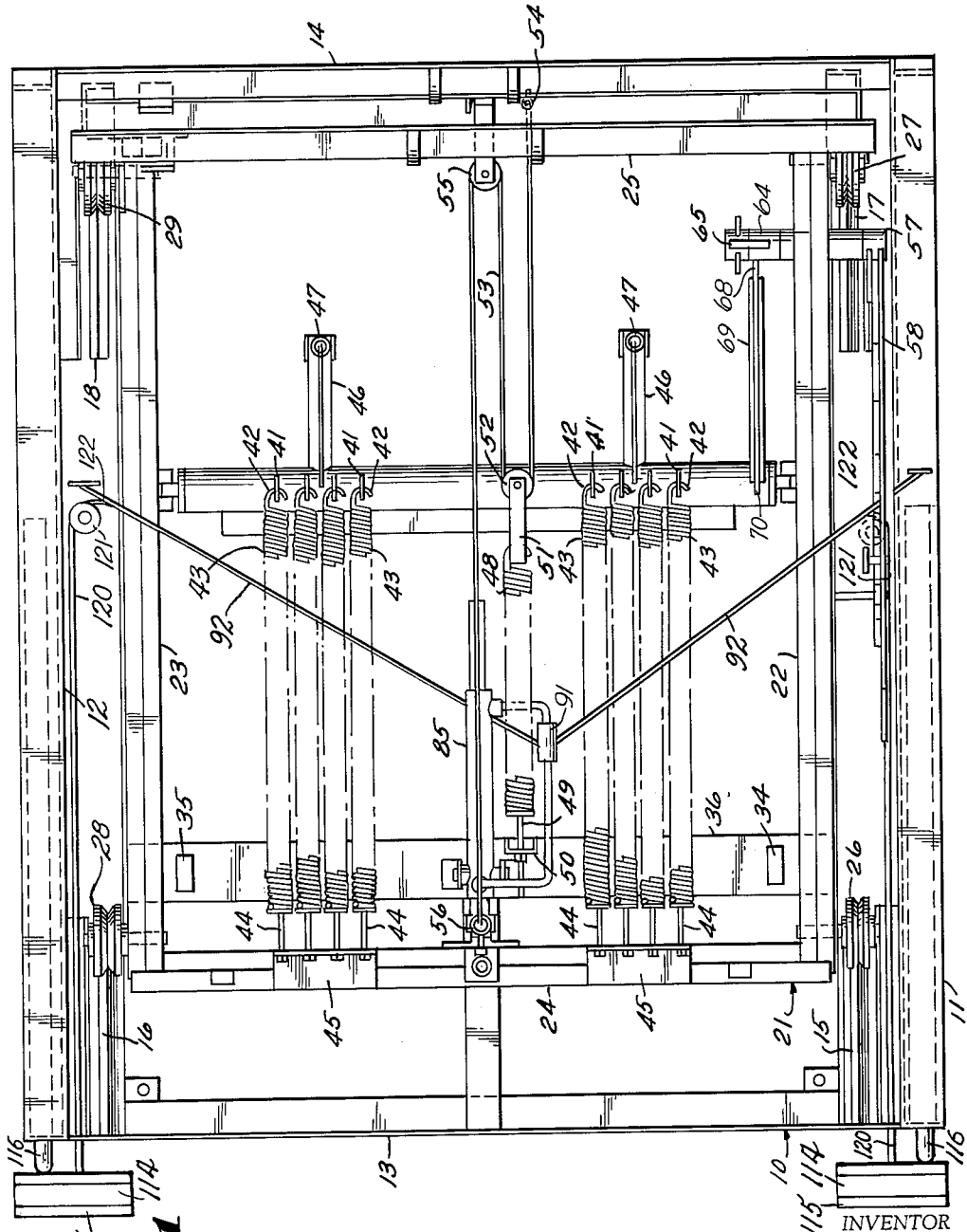

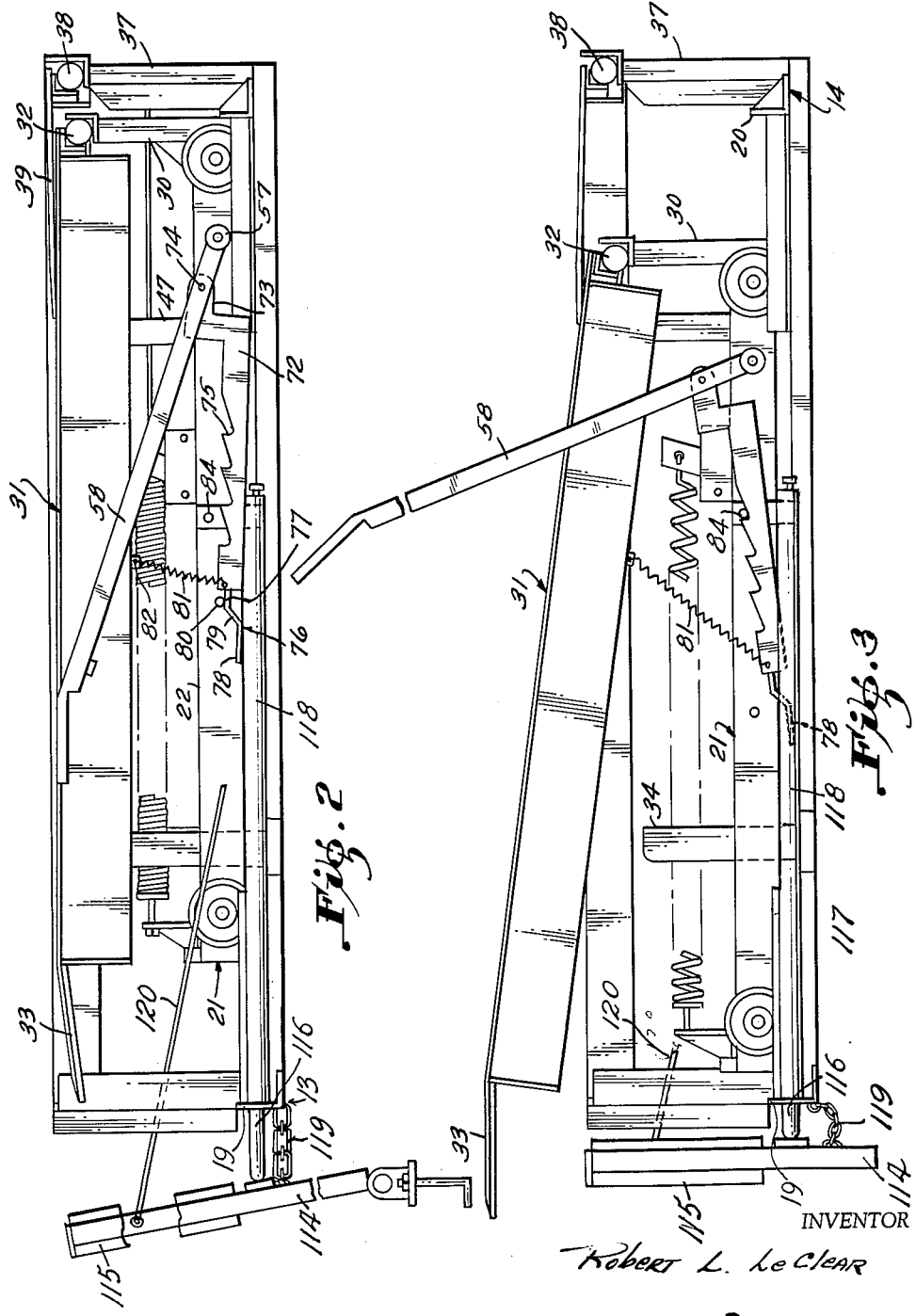

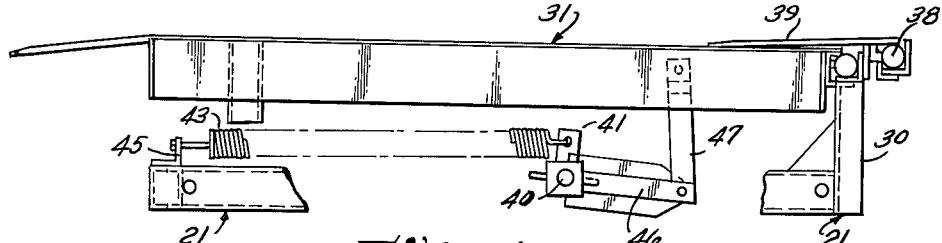
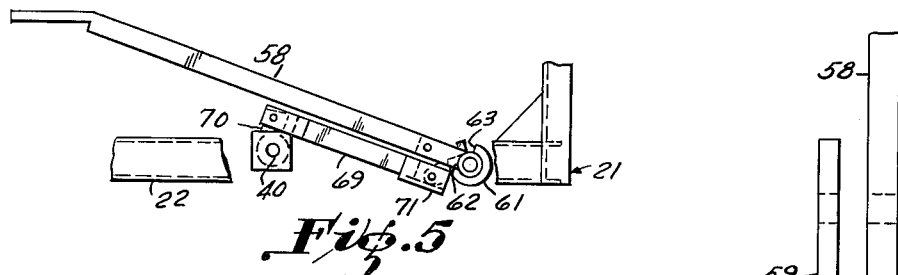
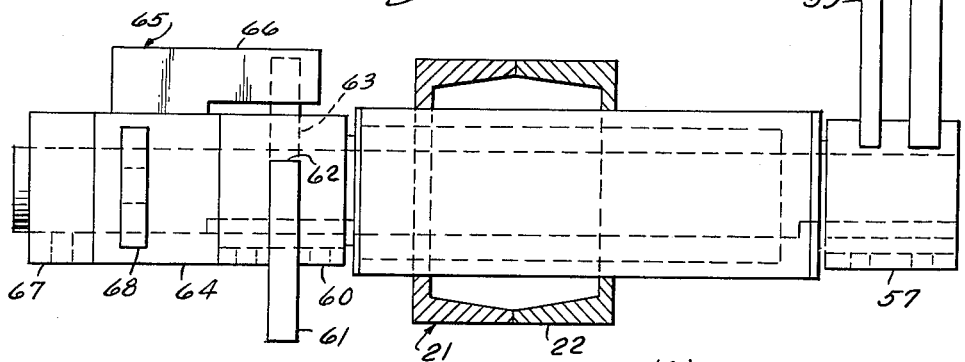
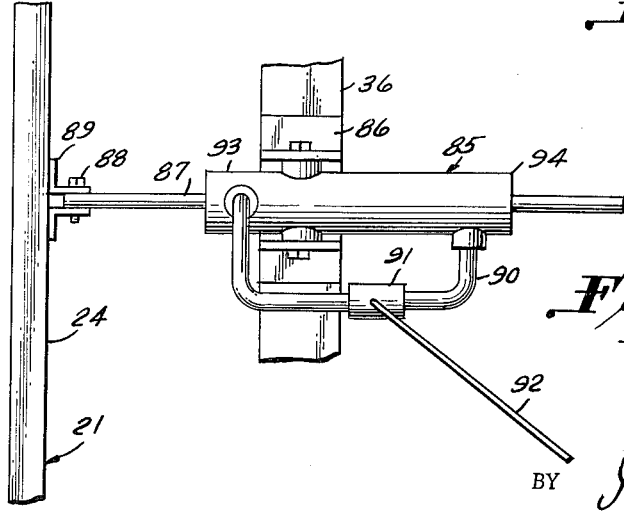

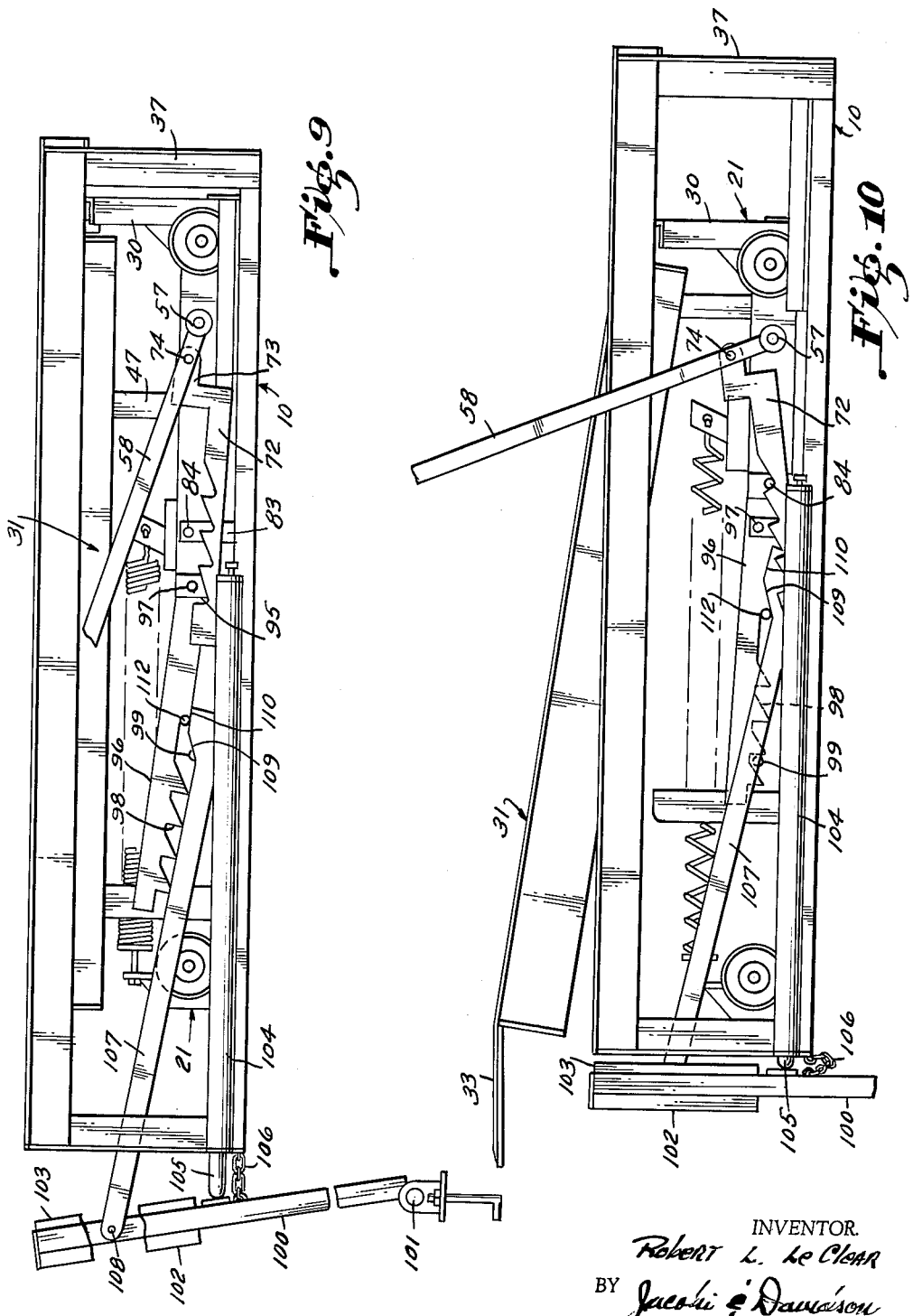

United States Patent Office 3,203,019
Patented Aug. 31, 1965

3,203,019
MANUALLY OPERATED DOCKBOARD CONSTRUCTION
Robert L. Le Clear, Albion, Mich., assignor to T & S Equipment Co., Albion, Mich., a corporation of Michigan
Filed Dec. 21, 1962, Ser. No. 246,381
The portion of the term of the patent subsequent to Jan. 8, 1980, has been disclaimed
4 Claims. (Cl. 14—71)

This invention relates to warehouse or loading platform equipment and more particularly to a dockboard for installation in a loading platform, which dockboard includes a ramp which is normally on a level with the remainder of the loading platform and located inwardly of the outer edge thereof, but which may be raised and moved outwardly of the loading platform and thereafter lowered onto the body of a truck for facilitating loading or unloading material from the loading platform to the truck body. After completion of the loading or unloading operation, the dockboard may be retracted inwardly of the outer edge of the loading platform and lowered into normal position. This application is related to my co-pending application Serial No. 46,695, filed August 1, 1960, now Patent No. 3,071,790, January 8, 1963.

Heretofore numerous types of dockboards have been proposed and utilized and some of these are power operated and relatively complex and costly and while these may be entirely suitable for relatively large and active installations, nevertheless, the same are far too costly and complex for use in connection with small warehouses or loading platforms where the dockboard might only be used occasionally and would not warrant the installation of a costly automatically operable model. Manually operated dockboards have also been previously proposed and utilized, but in many instances, these were relatively difficult to operate and furthermore, were subject to frequent damage due to engagement therewith by a truck or other vehicle backing into position and in many instances, the use of such prior art manually operated dockboards was limited to trucks of a certain height and also necessitated accurate positioning of the truck with relation to the loading platform in order that the dockboard would properly engage the body thereof. Furthermore, many of these prior art manually operated dockboards failed to provide structure wherein single lever operation was provided to raise, move the dockboard forwardly and lower the ramp onto the truck. It was, therefore, necessary to operate two or more levers to accomplish these functions or to utilize a single lever for raising and lowering the ramp and some other method of moving the dockboard forwardly and rearwardly.

It is accordingly an object of the invention to provide a manually operated dockboard which may be conveniently and economically constructed from readily available materials and conveniently installed in a loading platform or other location and which may be operated to position the ramp of the dockboard on the body of a truck by operation of a single lever, such lever being operable to raise the ramp and move the same forwardly over the body of the truck and thereafter lower the same onto the body for loading or unloading operations.

A further object of the invention is the provision of a manually operated dockboard including a ramp which is normally level with the loading platform in which the dockboard is installed, the outer edge of the ramp also normally being located flush or inwardly of the outer edge of the loading platform in order to prevent inadvertent damage to the dockboard by engagement thereof with a truck body when backing into position.

A still further object of the invention is the provision of a manually operated dockboard including a ramp and a single operating lever which may be utilized to raise the ramp, move the same forwardly over the body of a truck and lower the same onto the body of the truck there being latch means for maintaining the ramp in forward position over the body of the truck and upon completion of the loading or unloading operation the latch means may be released to permit the ramp to return automatically to normal position flush with or inwardly of the forward edge of the loading platform in which the same is installed.

Another object of the invention is the provision of a manually operated dockboard including a ramp which may be raised moved forwardly over the body of a truck and lowered onto the body of the truck for loading or unloading operations and in which the weight of the ramp is at least partially counterbalanced by adjustable tension spring means incorporated in the structure of the dockboard.

A further object of the invention is the provision of a manually operated dockboard including a ramp and in which the ramp is normally level with the loading platform in which the same is installed and the outer edge of the ramp is normally flush with or inwardly of the outer edge of the loading platform, there being means provided for moving the ramp outwardly of the loading platform a desired distance in accordance with the position of a truck body to be loaded or unloaded, the dockboard including latch means for releasably holding the ramp in forward position and upon release of the latch means adjustable tension spring means is provided for automatically returning the ramp to normal position flush with or inwardly of the outer edge of the loading platform thereby preventing inadvertent damage to the dockboard.

A still further object of the invention is the provision of a manually operated dockboard which is entirely self-contained and requires only the provision of an upwardly and outwardly opening recess in a loading platform to permit installation of the dockboard, no part of the dockboard projecting above the level of the platform when the dockboard is not in use, thereby permitting utilization of the full area of the loading platform.

Another object of the invention is the provision of a manually operated dockboard including a ramp and in which the ramp is normally level with the loading platform in which the same is installed and the outer edge of the ramp is normally flush with or inwardly of the outer edge of the loading platform there being means provided for moving the ramp outwardly of the loading platform a desired distance in accordance with the position of the truck body to be loaded or unloaded, the dockboard including latch means for releasably holding the ramp in forward position, such latch means including a cylinder and piston forming part of a closed circuit hydraulic system which automatically operates to retain the ramp in forward adjusted position and which may be manually controlled to release the same and permit rearward movement of the ramp to normal position.

A further object of the invention is the provision of a manually operated dockboard including a ramp and in which the ramp is normally level with the loading platform in which the same is installed and the outer edge of the ramp is normally flush with or inwardly of the outer edge of the loading platform there being means provided for moving the ramp outwardly of the loading platform a desired distance in accordance with the position of a truck body to be loaded or unloaded, the dockboard including latch means for releasably holding the ramp in forward adjusted position there being also provided a bumper which may be engaged by a truck when backing into position, movement of the bumper serving to actuate means to condition the latch means to hold the ramp in forward adjusted position and movement of the truck away from the loading platform automatically causing release of the latching means to permit return of the ramp to normal position.

Further objects and advantages of the invention will be apparent from the following description taken in conjunction with the accompanying drawings wherein:

FIG. 1 is a top plan view of a dockboard constructed in accordance with this invention with the ramp removed to show the structure located therebeneath;

FIG. 2 a side elevational view of the dockboard in normal position with the ramp level with the upper surface of the loading platform in which the same is installed and with the forward edge of the ramp retracted flush with or inwardly of the forward edge of the loading platform;

FIG. 3 a side elevational view similar to FIG. 2, but showing the ramp in raised position and moved forwardly prior to lowering the same onto the body of a truck;

FIG. 4 a fragmentary side elevational view with parts broken away for greater clarity and showing the structure of the counterbalancing mechanism;

FIG. 5 a fragmentary side elevational view with parts broken away and showing a portion of the manual operating means for raising and lowering the ramp;

FIG. 6 an elevational view with parts in section and showing a portion of the manual operating means for raising and lowering the ramp;

FIG. 7 a fragmentary top plan view showing the hydraulic system providing latch means for releasably maintaining the ramp in forward position;

FIG. 8 a top plan view similar to FIG. 1, but showing a modified form of the invention providing a different type of latch mechanism which is automatically operable by movement of a truck into loading position and movement of the truck away from loading position;

FIG. 9 a side elevational view similar to FIG. 2, but showing the modified form of latch mechanism and with the dockboard in inoperative position; and FIG. 10 a side elevational view similar to FIG. 3 and showng the modified form of latch mechanism in operative position as the result of movement of a truck into loading position.

With continued reference to the drawings, there is shown a dockboard constructed in accordance with this invention and which may well comprise a generally rectangular frame 10 having side members 11 and 12, a front end cross member 13 and a rear end cross member 14. The frame 10 may be mounted in an upwardly and outwardly opening recess in a loading platform, but it is not considered necessary or desirable to show such platform in the drawings, since the same is conventional in every respect. A front pair of rails 15 and 16 are secured to the frame 10 adjacent the side members 11 and 12 and the rails 15 and 16 extend rearwardly from the front end cross member 13. In a similar manner, a rear pair of rails 17 and 18 are secured to the frame adjacent the side members 11 and 12 and extend forwardly from the rear end cross member 14. As best shown in FIGS. 2 and 3, the front end cross member 13 is provided with an upstanding portion 19 which projects above the rails 15 and 16 and the rear cross member 14 is provided with an upstanding portion 20 which projects above the rails 17 and 18. The upstanding portions 19 and 20 are provided for a purpose which will be later described.

A generally rectangular carriage 21 is made up of side bars 22 and 23, a front cross bar 24 and a rear cross bar 25. Mounted on the side bar 22 are front and rear rollers 26 and 27 and mounted on the side bar 23 are front and rear rollers 28 and 29. The rollers 26 and 28 engage the tracks 15 and 16 while the rollers 27 and 29 engage the tracks 17 and 18 to support the carriage 21 for forward and rearward movement between the upstanding portions 19 and 20 on the front and rear end cross members 13 and 14. Such upstanding portions 19 and 20 forming stops to limit forward and rearward movement of the carriage 21. The carriage 21 is provided, at the rear end thereof, with an upwardly extending transverse support 30 and a generally rectangular ramp 31 is hingedly mounted at the rear end 32 on the upwardly extending support 30. The ramp 31 overlies the carriage 21 and is provided at the forward end with a forwardly extending lip 33, the purpose of which will later appear. Upwardly extending legs 34 and 35 are fixed to a cross brace 36 of the frame 10 and as shown in FIG. 2, the legs 34 and 35 serve to support the ramp 31 in substantially horizontal position and in such position, the upper surface of the ramp 31 is in alignment with the upper surface of the loading platform in which the dockboard of this invention is installed. An upwardly extending transverse support 37 is provided on the rear end of the frame 10 and hingedly mounted at 38 on the support 37 is an auxiliary ramp 39 which serves to bridge the space between the rear end of the frame 10 and the upper surface of the ramp 31 and it is to be noted that as shown in FIG. 3, the ramp 31 is slidable with respect to the auxiliary ramp 39 to provide a substantially continuous upper surface regardless of the position of the carriage 21 and ramp 31 carried thereby with respect to the frame 10.

A rock shaft 40 is rotatably mounted on the side bars 22 and 23 of the carriage 21 and extends transversely of the carriage as clearly shown in FIG. 1 and a plurality of spaced ears 41 extend upwardly from the rock shaft 40 and are connected to one end 42 of tension springs 43. The opposite ends 44 of tension springs 43 are adjustably connected to brackets 45 secured to the front cross bar 24 of the carriage 21 and arms 46 extend rearwardly from the rock shaft 40 and are connected by links 47 with the ramp 31. The springs 43 provide a counterbalancing means for the ramp 31 and the tension of the springs 43 may be suitably adjusted by means of the adjustable connection with the bracket 45 to partially counter-balance the weight of the ramp 31 thereby providing a portion of the force required to pivotally move the ramp 31 upwardly but permitting downward movement of the ramp 31 by the force of gravity.

A return spring 48 is adjustably connected at one end 49 to a bracket 50 fixed to the cross brace member 36 of the frame 10 and the opposite end 51 of the spring 48 is provided with a pulley 52 which engages a cable 53, one end of which is attached at 54 to the rear end cross member 14 of the frame 10. The cable 53 also passes over a pulley 55 secured to the rear end cross member 14 of the frame 10 and the opposite end of the cable 53 is connected at 56 to the front cross bar 24 of the frame 21. The tension of the return spring 48 is so adjusted as to exert a rearward force through the cable 53 on the carriage 21 to urge the same rearwardly to the position shown in FIG. 2, but permitting forward movement of the carriage 21 to the position shown in FIG. 3 against the action of the return spring 48.

An actuating shaft 57 is rotatably mounted on the side bar 22 of the carriage 21 and as best shown in FIG. 1, the actuating shaft 57 projects inwardly and outwardly of the side bar 22. A hand lever 58 is fixed to the outer end of the actuating shaft 57 and as best shown in FIG. 6, an arm 59 is also fixed to the outer end of the shaft 57 in spaced alignment with the lever 58. A hub 60 is fixed to the actuating shaft 57 inwardly of the side bar 22 of the carriage 21 and the hub 60 is provided with a disk 61 thereon and a portion of the disk 61 is removed to provide angularly spaced shoulders 62 and 63, as clearly shown in FIGS. 5 and 6. A sleeve 64 is mounted for free rotation on the actuating shaft 57 inwardly of the hub 60 and the sleeve 64 is provided with a lug 65 having a portion 66 overhanging the hub 60 and disposed between the shoulders 62 and 63 to provide a lost motion connection between the sleeve 64 and the disk 61, carried by the hub 60. A collar 67 is fixed to the inner end of the actuating shaft 57 to retain the sleeve 64 in place thereon. A crank arm 68 is fixed to the sleeve 64 and a link 69, as best shown in FIGS. 1 and 5, connects the crank arm 68 with a crank arm 70 fixed to the rock shaft 40. The link 69 is provided adjacent the rear end connected to the crank arm 68 with a depending pad 71, the purpose of which will be presently described.

With particular reference to FIGS. 2 and 3, a ratchet bar 72 is provided with a rear end portion 73 disposed between the lever 58 and arm 59 on the actuating shaft 57 and a pivot pin 74 serves to pivotally connect the ratchet bar 72 with the lever 58 and arm 59. The ratchet bar 72 extends longitudinally of the carriage 21 and is provided with upwardly facing spaced teeth 75 and at the forward end is provided with a cam 76. The cam 76 is provided with an upper flat portion 77, a lower flat portion 78 and an inclined connecting portion 79. The cam follower in the form of a pin 80 is mounted on the side bar 22 of the carriage 21 and engages the cam 76 as clearly shown in FIG. 2. The cam 76 is normally held in engagement with the cam follower pin 80 by means of a tension spring 81 connected between the ratchet bar 72 and a lug 82 on the ramp 31. An upstanding bracket 83 is fixed to the frame 10 and a pin 84 fixed to the bracket 83 projects over the ratchet bar 72 in a position to engage the teeth 75 thereon as clearly shown in FIG. 3.

The hand lever 58 is utilized to raise the ramp 31 and to also move the carriage 21 forwardly from the position shown in FIG. 2 to the position shown in FIG. 3 and for this purpose, upon movement of the lever 58 in a clockwise direction from the position shown in FIG. 2 to the position shown in FIG. 3, the actuating shaft 57 will be operated to move the shoulder 62 on the disk 61 into engagement with the overhanging portion 66 of the lug 65 on the sleeve 64 thereby rotating the sleeve 64 and by reason of the crank arms 68 and 70 and the connecting link 69, the rock shaft 40 will be rotated in a counterclockwise direction to move the arms 46 and links 47 to raise the ramp 31 from the position shown in FIG. 2 to the position shown in FIG. 3. During this operation, the crank 68 and link 69 move over dead center to a point where the pad 71 on the link 69 engages the surface of the arm 68 which will operate to lock the ramp 31 in the raised position shown in FIG. 3.

During clockwise movement of the lever 58, the ratchet bar 72 is moved rearwardly from the position shown in FIG. 2 to disengage the follower pin 80 from the flat surface 77 on the cam 76 with the follower pin 80 moving down the inclined portion 79 of the cam 76 and by reason of the action of the spring 81 the ratchet bar 72 will move upwardly to bring the pin 84 into engagement with one of the teeth 75 on the ratchet bar 72. With the ramp 31 locked in raised position as shown in FIG. 3 and described above, oscillation of the lever 58 and actuating shaft 57 causes free movement of the disk 61 with respect to the overhanging portion 66 of the lug 65 by reason of the space between the shoulders 62 and 63 which provide a lost motion connection and during this oscillatory movement, the pin 84 will progressively engage the teeth 75 on the ratchet bar 72 to move the carriage 21 forwardly in a step-by-step manner in what might be termed a jacking operation. Oscillation of the lever 58 is continued until the carriage 21 is moved to the desired forward position or to the extreme forward position with the cross member 24 engaging the upstanding stop member 19 on the front cross member 31 of the frame 10.

Upon movement of the carriage 21 and ramp 31 carried thereby to the desired forward position counter-clockwise movement of the hand lever 58 a sufficient distance to engage the shoulders 63 of the disk 61 with the overhanging portion 66 of the lug 65 will operate to move the crank arm 68 and link 69 out of the dead center position to permit downward movement of the ramp 31 under the action of gravity and against the force exerted by the counter-balancing means described above which, of course, operated to reduce the actuating force necessary to be applied to the hand lever 58 to accomplish raising of the ramp 31.

Since the carriage 21 is moved forwardly, as described above, against the action of return spring 48, it is necessary to provide a latch means for retaining the carriage 21 in adjusted forward position and for this purpose, the latch means, as best shown in FIGS. 1 and 7, may well comprise a hydraulic cylinder 85 secured by any suitable means to a bracket 86 mounted on the cross brace member 36 of the frame 10. The hydraulic cylinder 85 is provided with a piston slidably mounted therein and secured to the piston is a piston rod 87 which projects forwardly and is connected at 88 to a bracket 89 fixed to the front cross bar 24 of the carriage 21. The hydraulic cylinder 85 is sealed at both ends by suitable means and connecting the ends of the cylinder 85 on opposite sides of the piston therein is a conduit 90 having a releasable check valve 91 connected thereto. A cable 92 or other suitable means may lead from the releasable check valve 91 to a convenient position at the side of the frame 10 to allow the operator to actuate the releasable check valve 91 in a manner to be presently described.

The latch means, above described, operates to retain the carriage 21 and ramp 31 carried thereby in adjusted forward position by reason of the fact that upon forward movement of the carriage 21, the piston rod 87 and piston carried thereby moves within the cylinder 85 in a forward direction toward the left as viewed in FIG. 7 to cause the flow of hydraulic fluid which the cylinder 85 is filled from the forward end 93 of the cylinder 85 on one side of the piston through the conduit 90 and one-way check valve 91 to the opposite end 94 of the cylinder 85 on the opposite side of the piston. Since the check valve 91 will not normally permit return flow of the fluid from the end 94 to the end 93 of the cylinder 85, the carriage 21 will be retained in adjusted forward position against the action of return spring 48. When it is desired to permit return of the carriage 21 to the rearward position, as shown in FIG. 2, it is only necessary to actuate the cable or other means 92 to open the check valve 91 to thereby permit flow of fluid from the end 94 of the cylinder 85 to the end 93 thereby permitting return movement of the carriage 21 to the position shown in FIG. 2 by reason of the action of return spring 48.

It will be seen that by the above described invention there has been provided a relatively simple, yet highly effective dockboard construction in which the ramp may be raised, moved forward to a desired position and lowered onto the body of a truck or other vehicle by operation of a single actuating lever and furthermore, an extremely simple means is provided for retaining the carriage and ramp carried thereby in adjusted forward position which means may be conveniently released to permit return of the ramp and carriage to inoperative position. The dockboard construction described above is completely self-contained and, therefore, may be conveniently installed in any conventional loading platform, it only being necessary to provide a suitable recess therein for receiving the dockboard structure.

If desired, automatic means may be provided to release the valve 91 upon movement of a vehicle away from the platform and the mechanism for accomplishing this purpose will be later described.

With particular reference to FIGS. 8, 9 and 10, there is shown a modified form of dockboard in which the modification consists in replacing the hydraulic means for retaining the carriage in adjusted forward position as described above and replacing such means with an automatically operable latch means which operates to perform the same function. Since the structure of the frame, the carriage, the ramp, the counter-balancing means and the actuating means for raising the ramp, moving the carriage and ramp to forward position and lowering the ramp is the same as that described above in connection with the first form of the invention, no further description of the details of this structure is provided in connected with the modified form of the invention and the same reference numerals are utilized in FIGS. 8, 9 and 10 to designate the same parts as those appearing in FIGS. 1 to 7.

The automatically operable latch means for retaining the carriage in adjusted forward position as shown in FIGS. 8, 9 and 10 is duplicated on both sides of the dockboard structure and consequently the structure and operation of the latch means will be described with respect to one side only of the dockboard structure and like reference numerals are utilized to designate the corresponding parts on both sides of the structure. An upstanding bracket 95 is provided on the frame 10 between the side bar 22 of the carriage 21 and the side member 11 of the frame 10 and a latch bar 96 is pivotally mounted adjacent the rear end thereof by means of a pivot pin 97 extending through the latch bar 96 and the bracket 95. The latch bar 96 extends forwradly in substantially parallel relationship to the side bar 22 of the carriage 21. The lower edge of the latch bar 96 is provided with spaced teeth 98. A latch pin 99 is fixed to the side bar 22 of the carriage 21 and projects outwardly beneath the latch bar 96 and serves to engage the teeth 98 on the latch bar 96 during operation of the carriage retaining means.

An upstanding bumper bar 100 is pivotally mounted at the lower end 101 in any desired manner and such mounting may be on the forward face of the loading platform or, if desired, other mounting means may be provided. The bumper bar 100 is provided, adjacent the upper end thereof, with a yieldable bumper 102 positioned in such a manner as to engage a truck or other vehicle backing into position at the loading platform and an additional yieldable bumper 103 is provided on the rear side of the bumper bar 100 adjacent the upper end thereof, the bumper 103 serving to prevent damage to the dockboard structure in the event the same is moved into contact therewith by inward movement of the vehicle. Mounted on the frame 10 is an elongated tube 104 within which is slidably mounted a plunger 105 and the plunger 105 is urged outwardly into engagement with the bumper bar 100 by means of a compression spring or other suitable means disposed within the tube 104. The plunger 105 serves to move the bumper bar 100 outwardly away from the frame 10 and in order to limit the outward movement of the bumper bar 100, there may be provided a chain or other flexible member 106 connecting the frame 10 and the bumper bar 100.

A cam bar 107 is pivotally connected at the forward end to the bumper bar 100 by means of a pivot pin 108 and the cam bar 107 is provided at the rear end with an inclined cam surface 109 which terminates in a raised flat surface 110. The lower edge of the cam bar 107 adjacent the rear end thereof rides on and is guided by a roller 111 mounted on the frame 10. An outwardly projecting cam follower roller 112 is provided on the latch bar 96 and such cam follower roller 112 projects outwardly above the cam bar 107 in a position to be engaged by the inclined cam surface 109 and the raised flat surface 110.

In the position shown in FIG. 9, the latch bar 96 is moved upwardly out of engagement with the latch pin 99 by reason of the fact that the cam follower roller 112 is in engagement with the raised flat portion 110 on the cam bar 107. When a truck or other vehicle backs into position in front of the dockboard structure, such truck or vehicle engages the bumper 102 on the bumper bar 100 to move the same rearwardly against the action of the plunger 105 and this rearward movement serves to move the cam bar 107 rearwardly thereby permitting the cam follower roller 112 to move down the inclined cam surface 109, thereby permitting the latch bar 96 to move downwardly and bring the teeth 98 into engagement with the latch pin 99. Upon operation of the actuating lever 58, as described above in connection with the first form of the invention, the ramp 31 is raised and the carriage 21 moved forwardly which will operate to move the latch pin 99 forwardly with respect to the latch bar 96 and such latch pin 99 will progressively engage the teeth 98 on the latch bar 96 to latch the carriage 21 and ramp 31 carried thereby in adjusted forward position. Further operation of the lever 58 as described above will operate to move the ramp 31 downwardly onto the truck or other vehicle to facilitate loading or unloading thereof. Upon completion of the loading or unloading operation, the truck or other vehicle pulls away from the loading platform thereby permitting the plunger 105 to urge the bumper bar 100 forwardly and this movement also causes forward movement of the cam bar 107 which will cause the cam follower roller 112 to move up the inclined cam surface 109 to the raised flat surface 110 which will operate to raise the latch bar 96 and disengage the teeth 98 from the latch pin 99 thereby permitting rearward movemovement of the carriage 21 under the action of return spring 48.

It will thus be seen that there has been provided a relatively simple, yet highly effective automatically operable means for latching the carriage and ramp in forward position and for permitting return movement thereof and by reason of the fact that the automatically operable latch means is duplicated on both sides of the dockboard structure, the same is operative regardless of whether the vehicle is disposed at right angles to the loading platform and dockboard structure or whether the same moves inwardly or outwardly at an angle to the loading platform, since the vehicle will contact one or the other of the bumpers 102 on the bumper bars 100 or in the event the same is disposed at right angles, both bumpers 102 will be engaged.

Again referring to FIGS. 1, 2 and 3, there is shown automatic means for releasing the check valve 91 upon movement of a vehicle away from the loading platform to permit return movement of the carriage 21 under the action of return spring 48, and such automatic means may comprise a bumper bar 114 pivotally mounted forwardly of the frame 10, and the upper end of the bumper bar 114 may be provided with suitable yieldable means 115 for engaging the body of a vehicle.

The bumper bar 114 is urged forwardly by a plunger 116 slidably received in a tubular member 117 attached to the frame 10, and the tubular member 117 may contain a compression spring, not shown, engaging the plunger 116 to urge the same outwardly into engagement with the bumper bar 114, and such spring may be adjusted by a suitable finger-engaging knob 118 provided on the rear end of the tubular member 117. Forward movement of the bumper bar 114 may be limited by a flexible member such as a chain 119 connected between the bumper bar 114 and the frame 10.

A flexible member such as a cable 120 is connected to the bumper bar 114, and is trained rearwardly and passes over a pulley 121 mounted on the frame 10, and is connected at 122 to the cable 92. As shown in FIG. 1, the bumper bar 114 and associated mechanism as well as the cable 120 and cable 92 are duplicated on both sides of the dockboard in order that the body of a vehicle approaching the loading platform at an angle will engage one or the other of the bumper bars 114, thereby assuring proper operation of the valve 91 through the cables 120 and 92.

The bumper bar 114 normally occupies the position shown in FIG. 2, in which case the cable 120 and cable 92 maintain the valve 91 open, thereby ensuring that the carriage 21 is in retracted position. Upon engagement of a vehicle with the bumper 115 of the bumper bar 114 the same will move rearwardly to the position shown in FIG. 3, at which time tension in the cable 120 and cable 92 is released, thereby permitting closing of the check valve 91 which will result in locking the carriage 21 in adjusted forward position. Upon movement of the vehicle away from the loading platform, the bumper bar 114 will again move to the position shown in FIG. 2, under the action of the spring pressed plunger 116, thereby applying tension to the cable 120 and cable 92 to open the check valve 91, thereby permitting return movement of the carriage 21 under the action of return spring 48.

It will be seen that by the above described invention there has been provided a relatively simple, yet highly effective means which may be utilized in connection with the hydraulic locking means to provide automatic operation upon movement of a vehicle toward and away from the loading platform.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. In a dockboard including a frame assembly, a carriage assembly supported for forward and rearward movement on said frame assembly, a ramp pivotally mounted on said carriage assembly, means to partially counterbalance the weight of said ramp, yieldable means to urge said carriage assembly rearwardly on said frame, and means to raise said ramp and move said carriage assembly forwardly on said frame assembly, the improvement comprising latch means for releasably retaining said carriage assembly in adjusted forward position, said latch means comprising a hydraulic cylinder secured to one of said assemblies, a piston slidable in said cylinder and having a piston rod secured to the other of said assemblies, a conduit connecting the ends of said cylinder on opposite sides of said piston to provide a closed hydraulic circuit for the flow of fluid between opposite ends of said cylinder, a releasable check valve in said circuit to permit free flow of fluid from one side of said piston to the other side when said carriage assembly moves forwardly, said check valve preventing flow of fluid in the opposite direction to retain said carriage assembly in adjusted forward position, and means to release said check valve to permit flow of fluid in the opposite direction to permit rearward movement of said carriage assembly.

2. A dockboard as defined in claim 1 in which the means to release said check valve comprises manually operable means.

3. A dockboard as defined in claim 2 in which said manually operable releasing means comprises an actuating member connected to said check valve and terminating at a point on said frame convenient to an operator.

4. A dockboard as defined in claim 1 in which the means to release said check valve includes movably mounted vehicle engaging means, and means connecting said vehicle engaging means and said check valve to automatically release said check valve upon movement of a vehicle out of engagement with said vehicle engaging means.

References Cited by the Examiner

UNITED STATES PATENTS

| | | | |
|---|---|---|---|
| 2,036,474 | 4/36 | Hanson | 16—84 |
| 2,639,450 | 5/53 | Ramer | 14—71 |
| 2,993,219 | 7/61 | Pennington | 14—71 |

CHARLES E. O'CONNELL, *Primary Examiner.*

JACOB L. NACKENOFF, *Examiner.*